May 18, 1965
A. R. POLLASKY
3,183,755
SPACING MACHINE HAVING AUTOMATIC CONTROL MEANS
Filed June 14, 1963
3 Sheets-Sheet 2
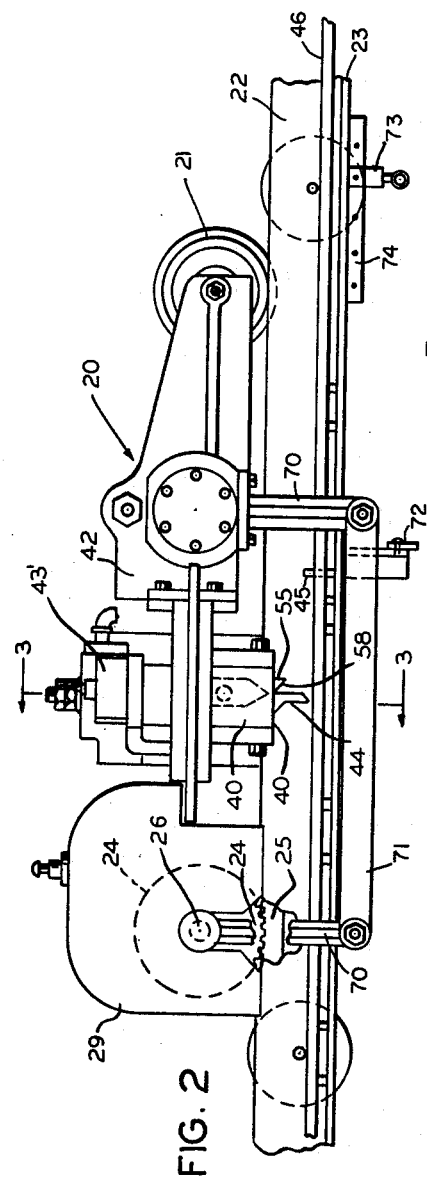
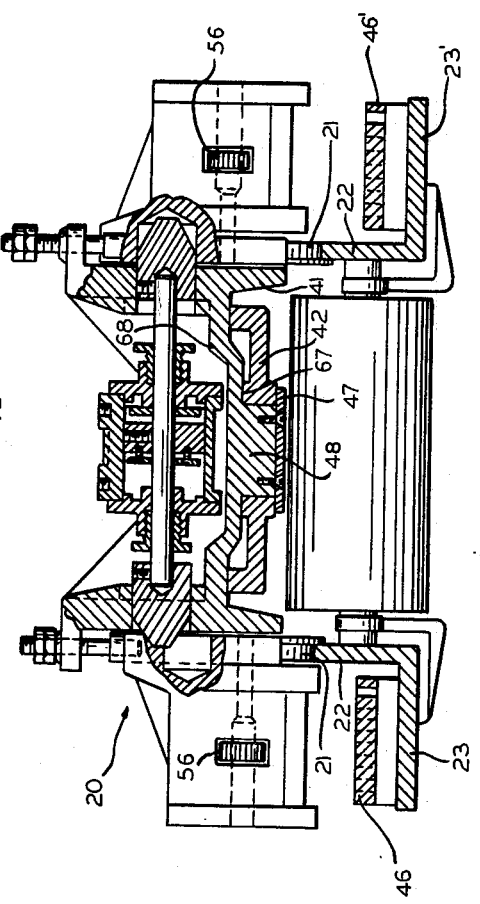
INVENTOR.
ARTHUR R. POLLASKY, DECEASED
BY ARTHUR G. POLLASKY, EXECUTOR
BY
Chester W. Brown
ATTORNEY May 18, 1965     A. R. POLLASKY     3,183,755
SPACING MACHINE HAVING AUTOMATIC CONTROL MEANS
Filed June 14, 1963     3 Sheets-Sheet 3

ARTHUR R. POLLASKY, DECEASED

BY ARTHUR G. POLLASKY, EXECUTOR
BY
Chester W. Brown
ATTORNEY 3,183,755
SPACING MACHINE HAVING AUTOMATIC
CONTROL MEANS
Arthur R. Pollasky, deceased, late of Milwaukee, Wis., by Arthur G. Pollasky, executor, 4443 N. 62nd St., Milwaukee, Wis.
Filed June 14, 1963, Ser. No. 288,049
2 Claims. (Cl. 83—396)

This application is a continuation in part of the application of Arthur R. Pollasky, Serial No. 793,404, filed February 16, 1959, now abandoned, for Improvement in Spacing Mechanism.

This invention relates to an improvement in the control means automatically responsive to spacing mechanism movement for successively interrupting the movement of the mechanism and reversing the direction of the movement at predetermined spaced points.

The invention hereinafter disclosed is an improvement in the control means for spacing mechanism such as disclosed in the Patent No. 1,796,939, issued to Arthur R. Pollasky March 17, 1931, for Spacing Mechanism.

It is well known to anyone familiar with automatic spacers, that it is customary for the operator to trip the punch or shear to advance the device to the next predetermined stop. In the device illustrated, described, and claimed herein, the stop pin causes the punch, or shear, to function, and the action of the spacer carriage causes the device to feed, return, and reset the work piece, and in this manner there is accomplished a full automatic cycle of operation.

The device is simple in construction, is adaptable for electric, pneumatic or hydraulic control, may be used with any type of material, such as, structural steel, angles, channels or sheets, or the like, and performs a function not heretofore revealed in the art.

It is the principal object of this invention to provide for a spacing machine including a carriage mounted for travel on a track for automatically advancing a work piece in successive steps and returning the work piece to repeat the cycle, an automatic control means mounted on said carriage for swinging movement in a plane substantially paralleling the plane of movement of the carriage and including means successively engageable with fixed means on the track to cause said control to swing into engagement with circuit closing apparatus such as is found in electrical or fluid power delivery systems.

Other objects will become apparent in the subsequent description of the drawings, in which—

FIG. 2 is a fragmentary side view as seen from the bottom relative to FIG. 1.

FIG. 3 is a fragmentary sectional view taken on the line 3—3 in FIG. 2.

Figure 1:
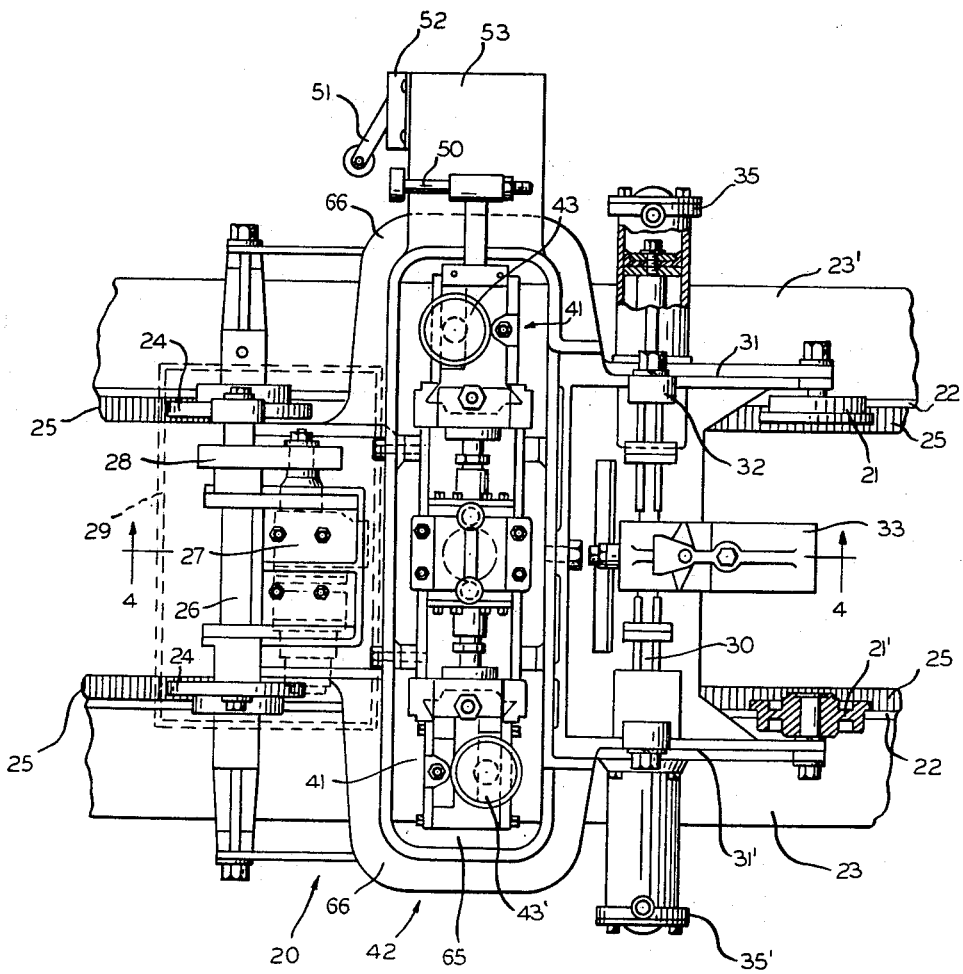
FIG. 1 is a fragmentary top plan view of a spacing carriage and the tracks upon which it moves.

Similar characters of reference indicate corresponding parts throughout the several views, and referring now to the same, the character 20 generally shows a movable carriage assembly that is supported on flanged rollers 21 and 21', contacting vertical walls 22 of the angle iron rails 23—23', and equipped with spur gears engaging gear racks 25 attached to the inner face of the vertical walls 22 of the angles 23, the gears 24 being mounted on, and rotated by, an axle shaft shown as 26, driven by the hydraulic or pneumatic motor 27, by means of a pinion and gear arrangement encased within a guard 28, as shown in FIG. 1. The motor 27 is shown protected by an enclosure 29.

The forward portion of the carriage 20, is equipped with a shaft 30, extending through and journalled in bearings supported by the arms 31 and 31' acting as a support for the flanged rollers 21 and 21' journalled therein. The shaft 30 is equipped with a hydraulically or pneumatically actuated means 32 equipped with a socket 33 slidably supported thereon, for moving the work support yoke (not shown). The socket member 33 is slidably adjusted sideways on the shaft 30 by means of the valves or cylinders 35 and 35' for placing the work piece (not shown) in proper alignment in the punch or shear (not shown).

The work piece (not shown), which is to be advanced by the carriage 20, is connected by suitable mechanism (not shown) to the socket member 33.

Figure 5:
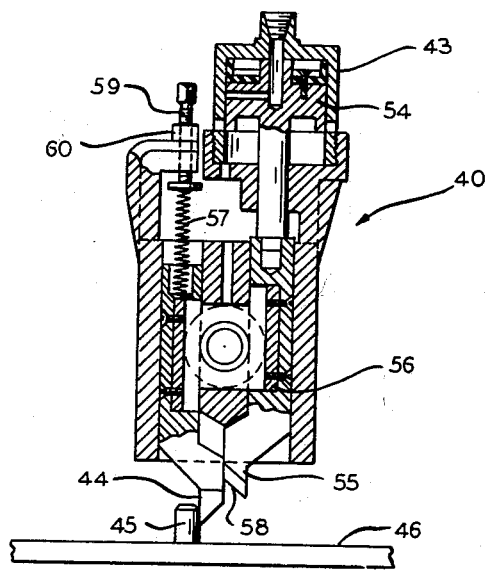
FIG. 5 is a vertical cross-sectional view of the actuator for operating the carriage control.

A control actuator 40 such as illustrated in vertical cross-section in FIG. 5, is carried at each end of the swivel frame 41 at 43—43'. The operation of the control actuator 40 is substantially similar to that described with reference to the device shown in FIG. 11 of the aforesaid Pollasky Patent 1,794,939. When the finger 44 of the control actuator at 43, assuming that the carriage is moving to the right relative to FIG. 2, engages a pin 45 carried by a perforated plate 46' mounted on the angle iron rail 23', the swivel frame 41 is caused to rotate in a counter-clockwise direction relative to FIG. 1 about its pivot 48 on the carriage frame 42. A retainer plate 47 secured to the pivot 46 retains the swivel frame rotatable on the carriage frame.

It will be understood by those skilled in the art, that the motor 27 carried by the carriage frame 42, drives the gears 24 which engage the gear racks 25.

As the swivel control 40 moves the swivel frame counter-clockwise, the adjustable arm 50, carried by the swivel frame 41, will contact the contact lever 51 and close the switch 52 (details not shown) carried by the bracket 53 on the carriage frame 42. An electrical circuit (not shown) will be closed and cause a work machine (such as a punch or shear) (not shown) to operate, then in turn a fluid circuit (not shown) will cause the plunger 54 in the cylinder 43 (FIG. 5) to move the finger 55. This, through gear 56 shown in broken lines in FIG. 5 meshes with a gear rack on finger 55, causes the finger 44 to move upwardly against the spring 57 and be disengaged from the pin 45, thus permitting the carriage to be advanced as soon as the advancing power circuit (not shown) is restored to operation. When the carriage begins its advance the beveled end 58 on the finger 55 will contact the pin 45 and the finger will move upwardly and simultaneously, through the gear 56 which meshes with a gear rack on finger 55, cause the finger 44 to move downwardly for contact with the next spacing pin (not shown) to set up the next sequence of operation similar to that noted. The bolt 59 serves as a means for varying the tension of the spring 57 and nut 60 serves to lock the bolt in adjusted position.

As previously indicated, the control actuator causes the frame 41 to swivel and carry the arm 50 into contact with the lever arm 51 thus when the switch 52 is operated to open its circuit (not shown) the fluid circuit (not shown) for operating the motor 27 is deenergized and the forward motion of the carriage is stopped. On the other hand, when the actuator 40 is operated as previously indicated to raise the finger 44 and permit the swivel frame 41 to return to the position shown in FIG. 1, the switch 52 automatically closes the circuit (not shown) for energizing the motor fluid circuit (not shown) and causes the motor 27 to advance the carriage 20 in the manner previously described.

The swivel frame is normally disposed at right angles transversely of the carriage frame as shown in FIG. 1. The aforedescribed sequence of control of the carriage, and work machine (not shown), obviously will move the swivel frame on its pivot in a counter-clockwise direction relative to FIG. 1 to a position extending angularly-transversely of the carriage frame. Obviously the swivel frame should be returned to its normal position. This may be accomplished in various ways (not shown), as by a biasing means (not shown) or by control actuator, like that described, mounted on the opposite end of the swivel frame at 43' and operated by pins similar to pin 45 and carried by the perforated plate 46.

Figure 4:
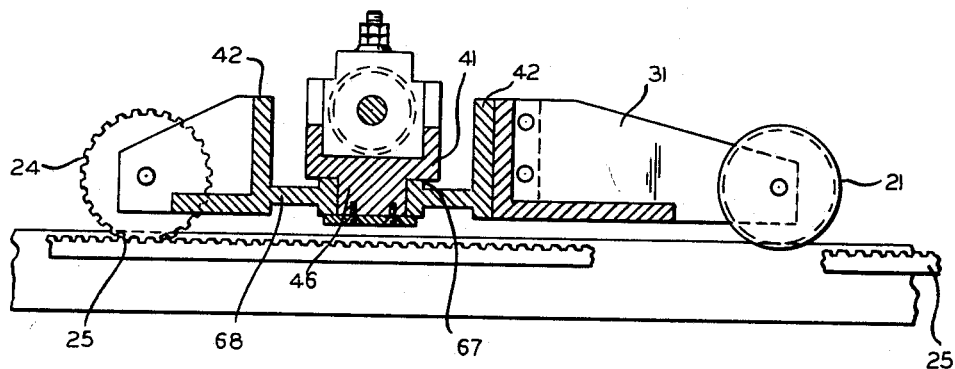
FIG. 4 is a fragmentary sectional view of the carriage frame and control mounting, parts being removed for clarity.

The carriage frame provides an elongated opening 65 transversely thereof and defined by frame portions 66 which are T-like in cross-section. The swivel bracket 41 is positioned within the opening 65 and is rotatably supported at 67 on the web-like base 68 integral with the carriage frame 42. As will be seen in FIGS. 3 and 4, the swivel frame 41 is provided with a cylindrical downward projection journaled in the web-like base to serve as a pivot 46 for the swivel bracket.

Another valve (not shown) similar in construction and mode of operation to the valve 73 is adjustably mounted on a spacer bar (not shown) similar to spacer bar 74 mounted on angle iron 23 at the opposite broken end of angle iron 23 and in spaced relation to the valve 73. These relatively spaced valves comprise the spaced reversing switch means and the stop means comprises the element 72 carried by the bar 71 and engageable alternately with the aforesaid valves.

The same general arrangement of the elements disclosed in FIG. 3 is the same as that disclosed in FIG. 10 of the patent to Pollasky 1,796,939 and the mode of operation relative to the control actuators 40 is fully set forth in said Patent 1,796,939.

It might be well to note here the novel disclosure in this application as distinguished from that in said patent to Pollasky 1,796,939. In the present application the control actuators 40 and associated elements (FIG. 3) are carried by a swingable frame 41 on the carriage frame 42.

From the above description it will become apparent that the arrangement shown incorporates a swivel feature on the carriage which may be electrically, pneumatically or hydraulically actuated to control the stopping of the work piece, to be punched or sheared, and the actuation of the carriage after the work piece is punched or sheared. In this manner the work piece is automatically conveyed to the point of operation, will be automatically stopped for the operation and again released for travel to the next stop to repeat the cycle.

The control valves, whether electric, pneumatic, or hydraulic operated, may be of standard design, and although there has been shown a specific structure and arrangement of the component parts constituting the device, one can be fully cognizant of the fact that many changes may be made in the form and configuration of the component parts without affecting the operativeness of the device, the spirit of the invention, or the scope of the claims.

Having thus described the invention, what is claimed and desired to secure by Letters Patent in the United States is:

1. In an automatic spacing mechanism including a longitudinally extending track, spacer bar secured to the track in parallel therewith and a stop pin, projecting from said bar, the combination with a work advancing carriage movably mounted on said track, of control means carried by said carriage, said control means comprising a control frame mounted on said carriage and swingable thereon and extending transversely of the line of travel of said carriage, a control actuator carried by said frame and disposed above said spacer bar, said control actuator including a retractable finger normally disposed for engagement with said pin, whereby said frame is caused to pivot on said carriage, circuit control means carried by said carriage including an actuating lever, and an arm on said frame disposed for contact with said lever when said frame is caused to swing, said control actuator including a second retractable finger disposed for engagement with said pin when said first mentioned finger is retracted, said second finger having a beveled end whereby said pin causes said second finger to retract and said first mentioned finger to advance.

2. In an automatic spacing mechanism for advancing a work piece to preselected positions relative to a tool, said mechanism comprising a track, a gear rack secured to and in parallel relation to said track, a spacer bar secured to and in parallel relation to said track and a stop pin projecting from said bar; the combination with a work piece advancing carriage movable longitudinally of said track and including a reversible motor mounted on said carriage and having a pinion operatively engaging said gear rack, of control means swivelly mounted on said carriage and extending transversely of said bar, trip means on said control means engageable with said stop pin and operative to produce swivel movement of said control means, a control switch mounted on said carriage and operative to control said tool, switch actuating means mounted on said control means and disposed for engagement and operation of said control switch when said control means is swivelled in one direction, a pair of relatively spaced reversing switch means carried by said bar and operative to effect reversal of said motor, and means carried by said carriage alternately engageable with said reversing switches, whereby movement of said carriage on said track is controlled subsequent to operation of said control switch.

References Cited by the Examiner
UNITED STATES PATENTS

| 1,564,096 | 12/25 | Moore et al. | 83—414 X |
| 1,796,939 | 3/31 | Pollasky | 83—396 |
| 1,918,600 | 7/33 | Hintz | 83—414 X |
| 2,187,827 | 1/40 | Eichman | 83—396 |

ANDREW R. JUHASZ, *Primary Examiner.*

WILLIAM W. DYER, *Examiner.*